(12) United States Patent
Nawratil et al.

(10) Patent No.: US 9,429,233 B1
(45) Date of Patent: Aug. 30, 2016

(54) BRAKE CLUTCH FOR AN AUTOMATIC TRANSMISSION

(71) Applicant: ZF Friedrichshafen AG, Friedrichshafen (DE)

(72) Inventors: Odilo Raphael Nawratil, Simpsonville, SC (US); James Frederick Vorberger, II, Simpsonville, SC (US); Won Hyuk Lee, Greenville, SC (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/729,386

(22) Filed: Jun. 3, 2015

(51) Int. Cl.
| | |
|---|---|
| F16H 31/00 | (2006.01) |
| F16H 63/30 | (2006.01) |
| F16H 3/66 | (2006.01) |
| F16H 63/06 | (2006.01) |
| F16D 41/12 | (2006.01) |
| F16D 13/00 | (2006.01) |
| F16D 21/00 | (2006.01) |
| F16D 47/04 | (2006.01) |

(52) U.S. Cl.
CPC ............ *F16H 63/3026* (2013.01); *F16D 13/00* (2013.01); *F16D 21/00* (2013.01); *F16D 41/12* (2013.01); *F16D 47/04* (2013.01); *F16H 3/66* (2013.01); *F16H 63/065* (2013.01)

(58) Field of Classification Search
None
See application file for complete search history.

(56) References Cited

U.S. PATENT DOCUMENTS

| | | | | |
|---|---|---|---|---|
| 3,404,756 | A * | 10/1968 | Swift | F16D 55/2255 188/106 F |
| 3,575,268 | A * | 4/1971 | Kimata | F16D 65/54 188/196 P |
| 4,109,773 | A * | 8/1978 | Higgerson | F16D 13/755 192/111.14 |
| 4,159,754 | A * | 7/1979 | Airheart | F16D 65/54 188/106 F |
| 5,307,730 | A * | 5/1994 | Erwin | F16D 25/12 188/71.8 |
| 6,029,792 | A * | 2/2000 | Beitler | F16D 13/755 192/111.14 |
| 6,079,537 | A * | 6/2000 | Hofmann | E04F 11/1812 192/109 R |
| 8,607,953 | B2 * | 12/2013 | Morone | F16D 13/75 192/105 C |

* cited by examiner

*Primary Examiner* — Dirk Wright
(74) *Attorney, Agent, or Firm* — Dority & Manning, P.A.

(57) ABSTRACT

A brake clutch for an automatic transmission includes a piston that is positioned adjacent a multi-disc clutch pack and is movable between an engaged configuration and a disengaged configuration relative to the multi-disc clutch pack. Teeth of a plurality of ratcheting teeth of the piston are meshed with teeth of a plurality of ratcheting teeth of a retaining assembly of the brake clutch. A related automatic transmission is also provided.

20 Claims, 4 Drawing Sheets

| | A | B | C | D | E | F |
|---|---|---|---|---|---|---|
| "1" | X | | | X | | X |
| "2" | X | | X | | | X |
| "3" | X | X | | | | X |
| "4" | X | | | | X | X |
| "5" | X | X | | | X | |
| "6" | X | | X | | X | |
| "7" | X | | | X | X | |
| "8" | | | X | X | X | |
| "9" | | X | | X | X | |
| "R" | | X | | X | | X |

BRAKE CLUTCH FOR AN AUTOMATIC TRANSMISSION

FIELD OF THE INVENTION

The present subject matter relates generally to automatic transmissions and shifting elements for automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Certain automatic transmissions include brake clutch shifting elements. During various gear shifts, the brake clutch is engaged or closed. However, engaging the brake clutch poses certain challenges. For example, certain brake clutches are hydraulically actuated such that hydraulic fluid moves a piston towards friction discs of the brake clutches. During initial calibrations, suitably positioning the piston relative to the friction discs can be a difficult and time consuming process. Similarly, over time the friction discs wear, and adjusting the brake clutch to account for such wear can be more difficult.

Accordingly, an automatic transmission with features for assisting with actuating and maintaining a suitable air gap within a brake clutch shifting element of the automatic transmission would be useful.

BRIEF DESCRIPTION OF THE INVENTION

The present subject matter provides a brake clutch for an automatic transmission. A piston of the brake clutch is positioned adjacent a multi-disc clutch pack of the brake clutch and is movable between an engaged configuration and a disengaged configuration relative to the multi-disc clutch pack. Teeth of a plurality of ratcheting teeth of the piston are meshed with teeth of a plurality of ratcheting teeth of a retaining assembly of the brake clutch. A related automatic transmission is also provided. Additional aspects and advantages of the invention will be set forth in part in the following description, or may be apparent from the description, or may be learned through practice of the invention.

In a first exemplary embodiment, an automatic transmission is provided. The automatic transmission includes a transmission housing that defines a slot. A plurality of planetary gear sets is disposed within the transmission housing. A plurality of shifting elements is also disposed within the transmission housing. The plurality of shifting elements includes a brake clutch. The brake clutch includes a multi-disk clutch pack. A piston is positioned adjacent the multi-disc clutch pack and is movable between an engaged configuration and a disengaged configuration relative to the multi-disc clutch pack. The piston defines a plurality of ratcheting teeth. A retaining assembly is received within the slot of the transmission housing. The retaining assembly defines a plurality of ratcheting teeth. The retaining assembly is mounted to the piston such that teeth of the plurality of ratcheting teeth of the piston mesh with teeth of the plurality of ratcheting teeth of the retaining assembly.

In a second exemplary embodiment, a brake clutch for an automatic transmission is provided. The brake clutch includes a multi-disk clutch pack. A piston is positioned adjacent the multi-disc clutch pack and is movable between an engaged configuration and a disengaged configuration relative to the multi-disc clutch pack. The piston defines a plurality of ratcheting teeth. A retaining assembly is positioned on and extends about the piston. The retaining assembly defines a plurality of ratcheting teeth. Teeth of the plurality of ratcheting teeth of the piston are meshed with teeth of the plurality of ratcheting teeth of the retaining assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figures 1, 2:
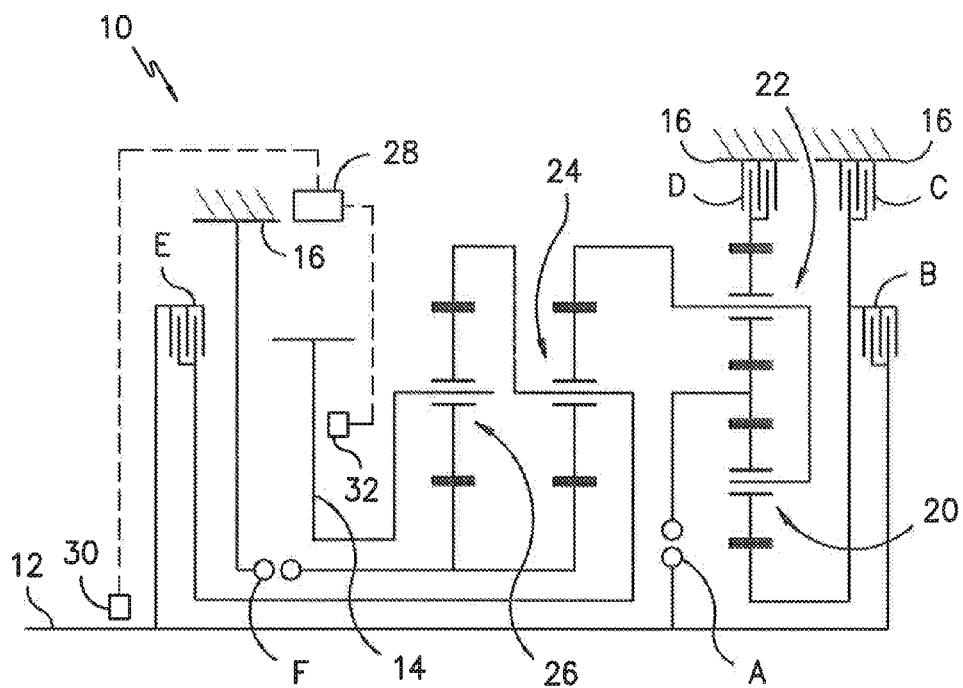
FIG. 1 provides a schematic view of an automatic transmission according to an exemplary embodiment of the present subject matter.
FIG. 2 illustrates a table of an exemplary shifting scheme as may be used with the exemplary automatic transmission of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or a turbine of an associated torque coupling, Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake ID and multidisc clutch F are in the disengaged configuration in second gear. In the fourth gear, dog clutch A, multidisc clutch F and dog clutch are in the engaged configuration. It should be understood that in certain exemplary embodiments, dog clutch A need not be in the engaged configuration to operate automatic transmission 10 in fourth gear. Thus, multidisc clutch F and dog clutch may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission, Thus, the present subject matter is not intended to be limited to use with automatic transmission 10. As an example, the present subject matter may be used in automatic transmissions having five forward gears, six forward gears, eight forward gears, etc. In addition, the present subject matter may be used in automatic transmissions with various driveline configurations, such as front-wheel drive, rear-wheel drive, all-wheel drive, etc.

Figure 3:
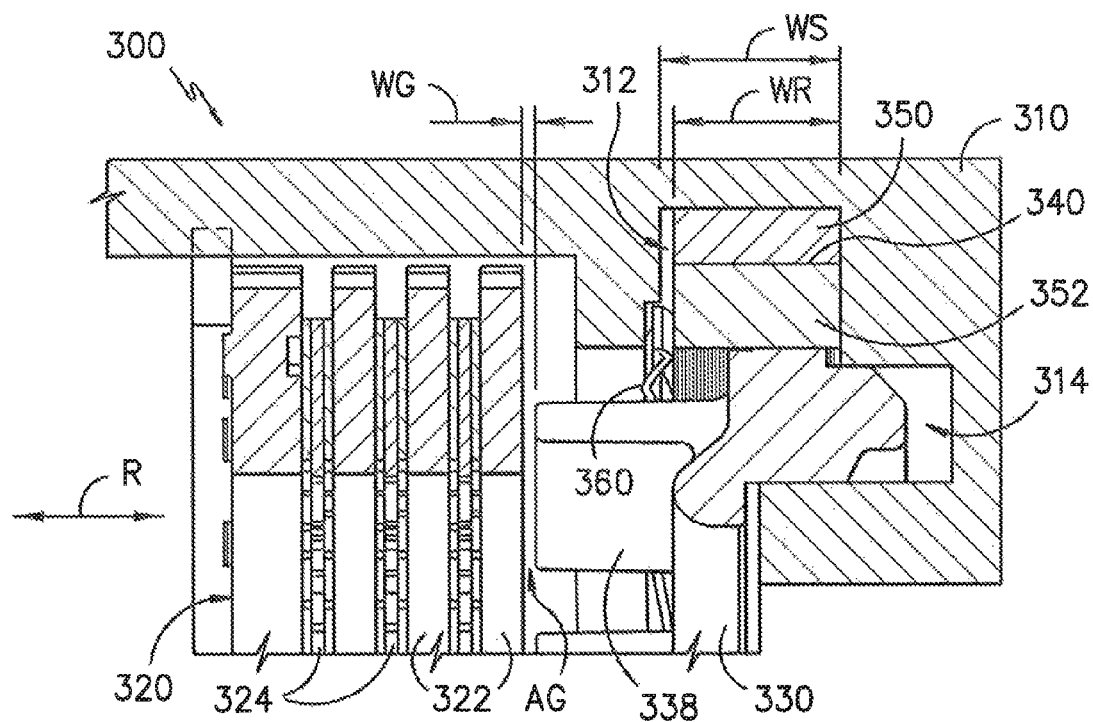
FIG. 3 provides a partial section view of a brake clutch according to an exemplary embodiment of the present subject matter.

FIG. 3 provides a partial section view of a brake clutch 300 according to an exemplary embodiment of the present subject matter. Brake clutch 300 may be used in or with any suitable automatic transmission. For example, brake clutch 300 may be used in automatic transmission 10 as one of multidisc brake C and multidisc brake D (FIG. 1). Thus, brake clutch 300 may selectively couple transmission housing 16 to the sun gear of first planetary gear set 20 or to the ring gear of second planetary gear set 22, in certain exemplary embodiments. To reiterate, while described in greater detail below in the context of automatic transmission 10, it should be understood that brake clutch 300 may be used in any other suitable automatic transmission in alternative exemplary embodiments.

As may be seen in FIG. 3, brake clutch 300 includes a multi-disk clutch pack 320, a piston 330 and a retaining assembly 340. Multi-disc clutch pack 320 includes various discs, such as a plurality of metal discs 322 and a plurality of (e.g., ceramic or ceramic coated) friction discs 324, that are selectively coupled together. At least one disk of multi-disk clutch pack 320 is mounted or fixed to a transmission housing 310, such as transmission housing 16, such that the at least one disk of multi-disk clutch pack 320 does not rotate relative to transmission housing 310, As an example, splines or projections of metal discs 322 may be received within transmission housing 310 in order to retain metal discs 322 within transmission housing 310. Conversely, splines or projections of friction discs 324 may be received by a gear of an associated planetary gear set, such as the sun gear of first planetary gear set 20 or the ring gear of second planetary gear set 22, in order to mount or retain friction discs 324 to such gear of the associated planetary gear set.

Piston 330 is positioned adjacent multi-disc clutch pack 320 and is configured for selectively actuating multi-disc clutch pack 320. Thus, piston 330 is movable, e.g., along an axial direction R of brake clutch 300, between an engaged configuration and a disengaged configuration relative to multi-disc clutch pack 320. Piston 330 of brake clutch 300 is shown in the disengaged configuration in FIG. 3. As may be seen in FIG. 3, piston 330 is spaced apart from multi-disc clutch pack 320, e.g., by an air gap AG along the axial direction R, in the disengaged configuration. Conversely, piston 330 is positioned on and contacts multi-disc clutch pack 320 in the engaged configuration. For example, piston 330 may be urged against multi-disc clutch pack 320 such that metal disc 322 and friction discs 324 do not rotate relative to one another in the engaged configuration.

By shifting between the engaged and disengaged configuration, transmission housing 31.0 may be selectively coupled to a gear of an associated planetary gear set. For example, the gear of the associated planetary gear set may rotate relative to transmission housing 310 in the disengaged configuration. Conversely, the gear of the associated planetary gear set does not rotate relative to transmission housing 310 in the engaged configuration. Piston 330 may be shifted between the engaged and disengaged configurations using any suitable mechanism or method. For example, hydraulic fluid may be pumped into a chamber 314 of transmission casing 310 in order to urge piston 330 from the disengaged configuration shown in FIG. 3 towards multi-disc clutch pack 320 along the axial direction R and into the engaged configuration.

As discussed above, brake, clutch 300 also includes a retaining assembly 340. Retaining assembly 340 is configured for assisting with mounting piston 330 within transmission casing 310, e.g., such that piston 330 is suitably positioned relative to multi-disc clutch pack 320. Thus, retaining assembly 340 may be positioned on and/or extend about piston 330. As may be seen in FIG. 3, retaining assembly 340 is received or disposed within a slot 312 defined by transmission housing 310, Slot 312 of transmission housing 310 may have an annular shape and extend about piston 330. Retaining assembly 340 also includes features for adjusting a position of piston 330 relative to retaining assembly 340, as discussed in greater detail below. Such features may assist with setting and/or maintaining the air gap AG between piston 330 and multi-disc clutch pack 320.

Brake clutch 300 also includes a spring 360. Spring 360 is configured for urging piston 330 towards the disengaged configuration. Spring 360 may be coupled to both transmission housing 310 and piston 330 (e.g., via retaining assembly 340). Thus, spring 360 may be positioned such that spring 360 urges piston 330 from the engaged configuration towards the disengaged configuration, e.g., when hydraulic fluid within chamber 314 of transmission casing 310 no longer holds piston 330 in the engaged configuration.

Figure 4:
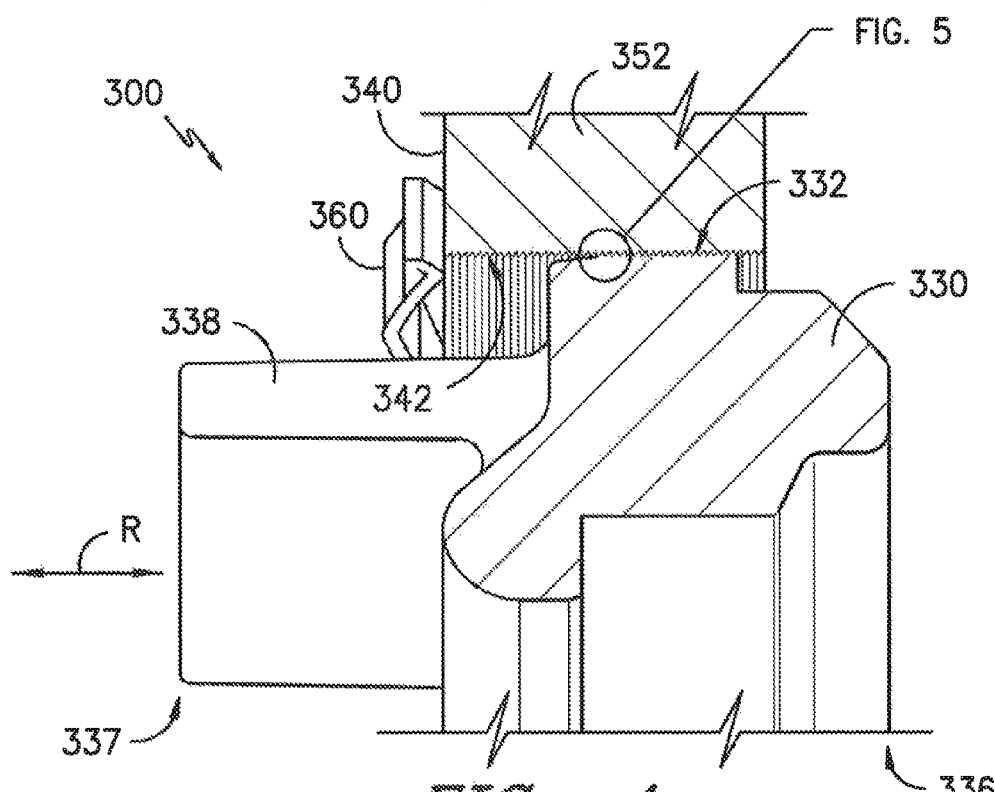
FIG. 4 provides another partial section view of the exemplary brake clutch of FIG. 3.
Figure 5:
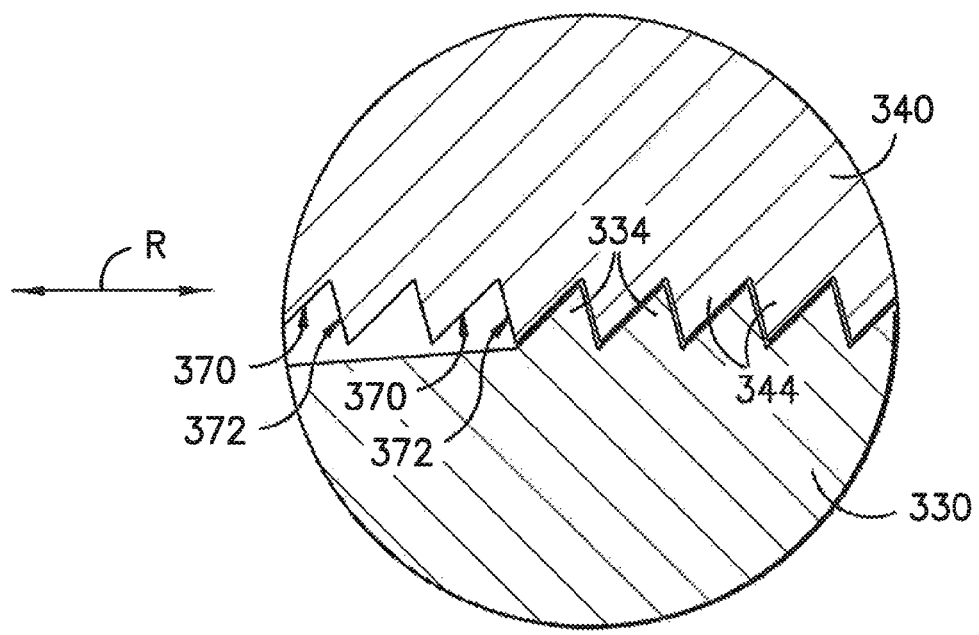
FIG. 5 provides a section view of a ratcheting interface of the exemplary brake clutch of FIG. 3.
Figure 6:
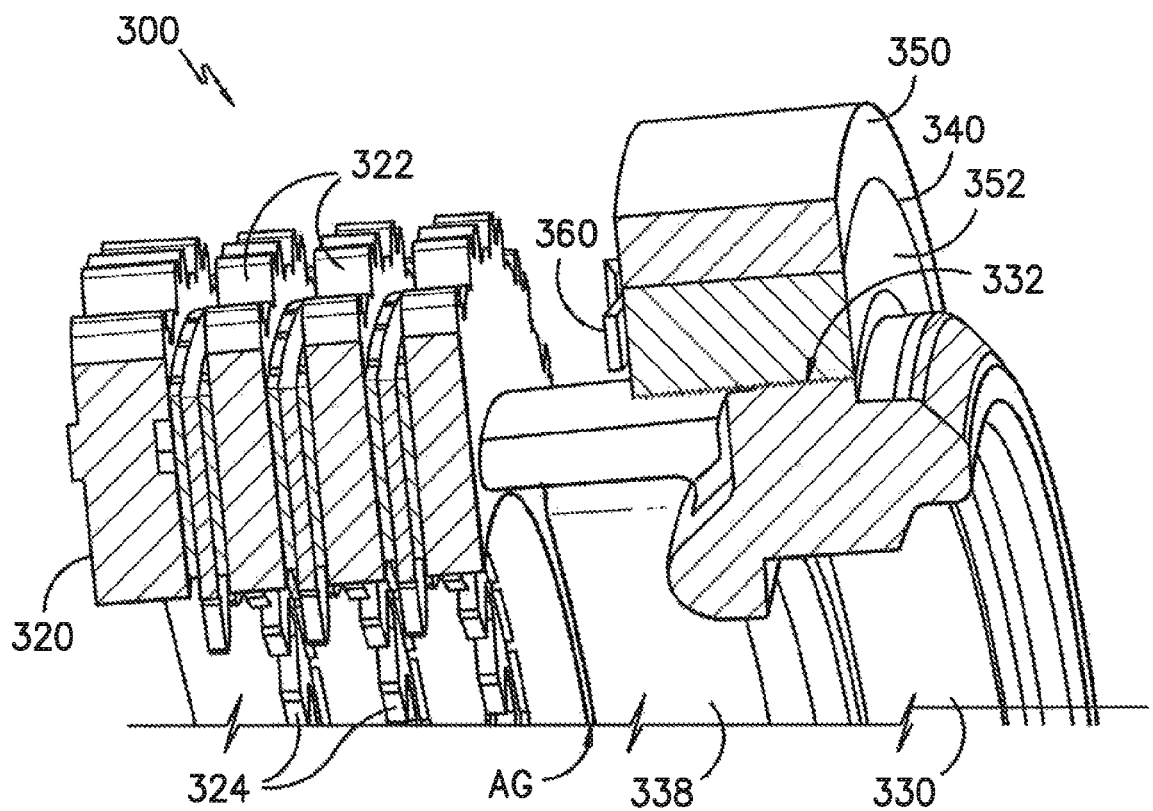
FIG. 6 provides a partial perspective view of certain components of the exemplary brake clutch of FIG. 3.

FIG. 4 provides another partial section view of brake clutch 300. FIG. 5 provides a section view of a ratcheting interface of brake clutch 300. FIG. 6 provides a partial perspective view of certain components of brake clutch 300, As may be seen in FIGS. 4 and 5, piston 330 defines a plurality of ratcheting teeth 334, and retaining assembly 340 also defines a plurality of ratcheting teeth 344. Ratcheting teeth 334 of piston 330 and ratcheting teeth 344 of retaining assembly 340 are positioned adjacent each other and are meshed together. As an example, ratcheting teeth 334 of piston 330 may be positioned or defined at an outer surface 332 of piston 330, and ratcheting teeth 344 of retaining assembly 340 may be positioned or defined at an inner surface 342 of retaining assembly 340.

Ratcheting teeth 334 of piston 330 are axially distributed or spaced along outer surface 332 of piston 330. In particular, ratcheting teeth 334 of piston 330 may be uniformly distributed or spaced along the axial direction R on outer surface 332 of piston 330. In addition, ratcheting teeth 334 of piston 330 may extend circumferentially about or on outer surface 332 of piston 330. Ratcheting teeth 344 of retaining assembly 340 may be similarly formed or positioned on inner surface 342 of retaining assembly 340. In particular, the shape of ratcheting teeth 344 of retaining assembly 340 on inner surface 342 of retaining assembly 340 may be complementary to the shape of ratcheting teeth 334 of piston 330 on outer surface 332 of piston 330.

As discussed above, retaining assembly 340 may be mounted to or engage piston 330 such that ratcheting teeth 334 of piston 330 mesh with ratcheting teeth 344 of retaining assembly 340. In particular, ratcheting teeth 334 of piston 330 and ratcheting teeth 344 of retaining assembly 340 may be formed and engage each other such that ratcheting teeth 334 of piston 330 and ratcheting teeth 344 of retaining assembly 340 permit or enable movement of piston 330 relative to retaining assembly 340 one way along the axial direction R and hinder or prevent movement of piston 330 relative to retaining assembly 340 another, opposite way along the axial direction R. In particular, ratcheting teeth 334 of piston 330 and ratcheting teeth 344 of retaining assembly 340 may be formed and engage each other such that the air gap AG between piston 330 and multi-disc clutch pack 320 is substantially uniform and/or constant.

Turning to FIG. 4, piston 330 extends between a first end portion 336 and a second end portion 337, e.g., along the axial direction R. First end portion 336 of piston 330 is positioned at and/or exposed to chamber 314 of transmission casing 310. Thus, hydraulic fluid within chamber 314 of transmission casing 310 may contact first end portion 336 of piston 330. Conversely, second end portion 337 of piston 330 is positioned at or adjacent multi-disc clutch pack 320. In particular, projections 338 of piston 330 may be positioned at second end portion 337 of piston 330, and the air gap AG may be defined between distal ends of projections 338 and an outer disc of multi-disc clutch pack 320.

Turning back to FIG. 3, retaining assembly 340 has a width WR, along the axial direction R. Similarly, slot 312 of transmission housing 310 also has a width WS, e.g., along the axial direction R. The width WS of slot 312 is larger than the width WR of retaining assembly 340. In particular, the width WS of slot 312 may be larger than the width WR of retaining assembly 340 by about (e.g., within ten percent of) a width WG, e.g., along the axial direction R, of the air gap AG when piston 330 is in the disengaged configuration. Such sizing of the width WS of slot 312 and the width WR of retaining assembly 340 may assist with suitably sizing the air gap AG between piston 330 and multi-disc clutch pack 320, as discussed in greater detail below.

Turning to FIG. 5, each tooth of ratcheting teeth 344 of retaining assembly 340 includes a sliding surface 370 and a locking surface 372. Sliding surfaces 370 of ratcheting teeth 344 of the retaining assembly 340 may be positioned such that sliding surfaces 370 of ratcheting teeth 344 of the retaining assembly 340 face away from multi-disk clutch pack 320, e.g., along the axial direction R. Conversely, locking surfaces 372 of ratcheting teeth 344 of the retaining assembly 340 may be positioned such that locking surfaces 372 of ratcheting teeth 344 of the retaining assembly 340 face towards multi-disk clutch pack 320, e.g., along the axial direction R. It should be understood that each tooth of ratcheting teeth 334 of piston 330 may also include a respective sliding surface and locking surface and/or be shaped to complement and face sliding and locking surfaces 370, 372 of ratcheting teeth 344 of retaining assembly 340.

Locking surfaces 372 of ratcheting teeth 344 of retaining assembly 340 are positioned and/or oriented for engaging ratcheting teeth 334 of piston 330 such that locking surfaces 372 block movement of piston 330 relative to retaining assembly 340, e.g., one way along the axial direction R. For example, locking surfaces 372 of ratcheting teeth 344 may define an angle with the axial direction R between about seventy-five degrees and about one hundred and five degrees. Conversely, sliding surfaces 370 of ratcheting teeth 344 of retaining assembly 340 are positioned and/or oriented for engaging ratcheting teeth 334 of piston 330 such that sliding surfaces 370 permit or enable movement of piston 330 relative to retaining assembly 340, e.g., a second, opposite way along the axial direction R. For example, sliding surfaces 370 of ratcheting teeth 344 may define an angle with the axial direction R between about sixty degrees and about thirty degrees. Thus, sliding and locking surfaces 370, 372 of ratcheting teeth 344 of retaining assembly 340 may only permit movement of piston 330 relative to retaining assembly 340 one way along the axial direction R.

In such a manner, piston 330 may be ratcheted towards multi-disc clutch pack 320, e.g., along the axial direction R during calibration of brake clutch 300 and/or to account for wear of multi-disc clutch pack 320, in order to maintain the width WG of the air gap AG at a substantially constant value. For example, as multi-disc clutch pack 320 wears, ratcheting teeth 334 of piston 330 and ratcheting teeth 344 of retaining assembly 340 permit piston 330 to move relative to retaining assembly 340, e.g., along the axial direction R, such that the width WG of the air gap AG does not substantially increase in size despite wearing of multi-disc clutch pack 320.

To provide such movement of piston 330 relative to retaining assembly 340 over time, a number of ratcheting teeth 344 of retaining assembly 340 may be greater than a number of ratcheting teeth 334 of piston 330. As an example, ratcheting teeth 344 of retaining assembly 340 may have at least ten more teeth than ratcheting teeth 334 of piston 330. As another example, ratcheting teeth 344 of retaining assembly 340 may have at least twenty more teeth than ratcheting teeth 334 of piston 330.

Figure 7:
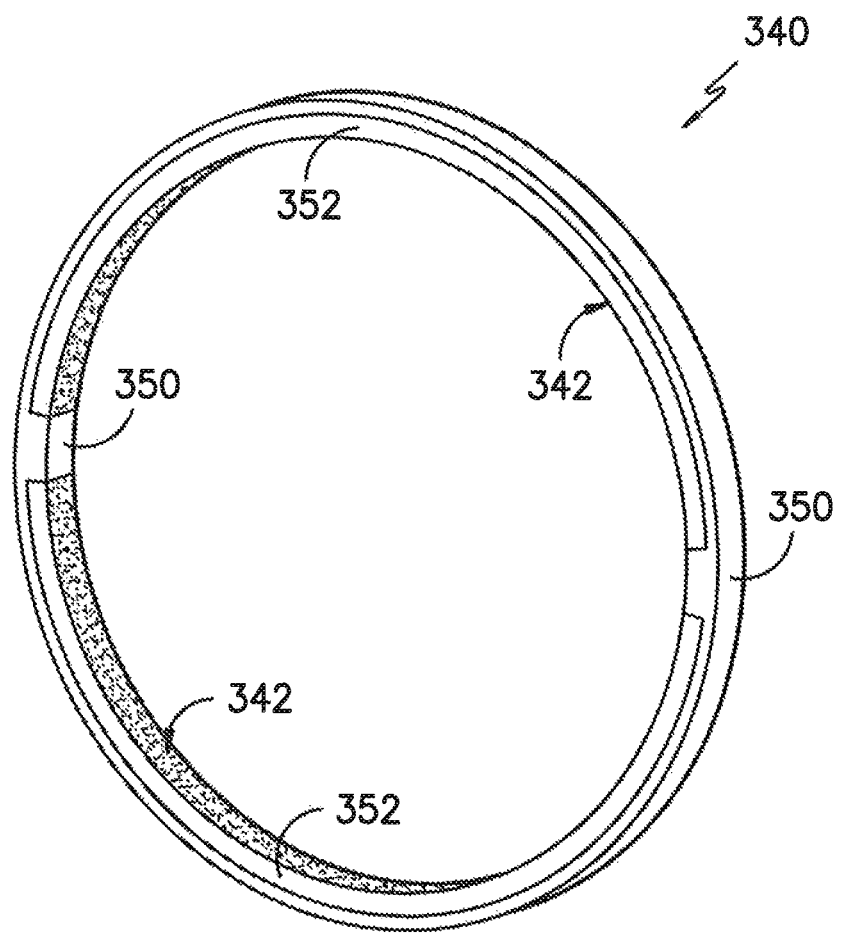
FIG. 7 provides a perspective view of a retaining assembly of the exemplary brake clutch of FIG. 3.

FIG. 7 provides a perspective view of retaining assembly 340 of brake clutch 300. In FIG. 7, the dot-pattern on inner surface 342 of retaining assembly 340 is provided to symbolize ratcheting teeth 344 of retaining assembly 340 on inner surface 342 of retaining assembly 340. As may be seen in FIG. 7, retaining assembly 340 includes an elastic compression ring 350 and a plurality of ratchet sleeves 352. Ratchet sleeves 352 are positioned at inner surface 342 of retaining assembly 340 and define ratcheting teeth 344 of retaining assembly 340. Ratchet sleeves 352 may also be circumferentially spaced apart from each other about piston 330. Elastic compression ring 350 extends about ratchet sleeves 352 and couples ratchet sleeves 352 to one another. In addition, elastic compression ring 350 compresses ratchet sleeves 352 onto piston 330, e.g., such that ratcheting teeth 334 of piston 330 mesh with ratcheting teeth 344 of retaining assembly 340. Retaining assembly 340 may include any suitable number of ratchet sleeves 352, e.g., two, three, four or more ratchet sleeves 352.

Elastic compression ring 350 may be constructed of or with any suitable material. For example, elastic compression ring 350 may be constructed of or with an elastomer. Ratchet sleeves 352 may also be constructed of or with any suitable material. For example, ratchet sleeves 352 may be constructed of or with a metal, such as aluminum, steel, bronze or suitable alloys.

As discussed above, features of piston 330 and retaining assembly 340 control and/or adjust the air gap AG between piston 330 and multi-disc clutch pack 320. For example, piston 330 may include ratcheting teeth 334 on outer surface 332 of piston 330, and retaining assembly 340 may include elastic compression ring 350 and ratcheting sleeves 352 that define ratcheting teeth 344 of retaining assembly 340. Elastic compression ring 350 may act as both a housing and radial compression element for ratcheting sleeves 352 of retaining assembly 340.

A difference between the width WS of slot 312 and the width WR of retaining assembly 340 (e.g., that corresponds to an air gap between retaining assembly 340 and transmission housing 310 at slot 312 of transmission housing 310 when piston 330 is in the disengaged configuration) determines or drives the width WG of the air gap AG between piston 330 and multi-disc clutch pack 320. Accurately controlling the width WG of the air gap AG between piston 330 and multi-disc clutch pack 320 is assisted by such design.

For example, as fluid pressure in chamber 314 of transmission housing 310 acts on piston 330, piston 330 moves towards multi-disc clutch pack 320 along the axial direction R. Due to the connection between piston 330 and retaining assembly 340, retaining assembly 340 also moves with piston 330. Spring 360 is compressed during such motion until retaining assembly 340 contacts transmission housing 310. When retaining assembly 340 is seated on transmission housing 110, any additional axial movement is fed into the ratchet interface between piston 330 and retaining assembly 340. Piston 330 is subsequently locked into position within retaining assembly 340 when hard contact is made between piston 330 and multi-disc clutch pack 320 and engagement pressure has reached a target value, It should be understood that the axial force required to engage the ratchet interface between piston 330 and retaining assembly 340 may greatly exceed a return force of spring 360 to permit such motion of piston 330.

When additional movement of piston 330 is enough to warrant engagement of adjacent ratcheting teeth at the ratchet interface between piston 330 and retaining assembly 340, ratchet sleeves 352 are forced to move out radially by overcoming the compressive force of elastic compression ring 350. After the last engageable ratcheting tooth is reached and fluid pressure in chamber 314 of transmission housing 310 is removed, spring 360 overcomes the off-pressure system friction and returns piston 330 to the disengaged configuration with the ratchet interface between piston 330 and retaining assembly 340 having adjusted to maintain the width WG of the air gap AG between piston 330 and multi-disc clutch pack 320, In such a manner, retaining assembly 340 can control the off-pressure, disengaged configuration position of piston 330 throughout the life of automatic transmission 10 and automatically adjust for wear of multi-disc clutch pack 320.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An automatic transmission, comprising:
a transmission housing defining a slot;
a plurality of planetary gear sets disposed within the transmission housing;
a plurality of shifting elements disposed within the transmission housing, the plurality of shifting elements including a brake clutch comprising
a multi-disk clutch pack;
a piston positioned adjacent the multi-disc clutch pack and movable between an engaged configuration and a disengaged configuration relative to the multi-disc clutch pack, the piston defining a plurality of ratcheting teeth;
a retaining assembly received within the slot of the transmission housing, the retaining assembly defining a plurality of ratcheting teeth, the retaining assembly mounted to the piston such that teeth of the plurality of ratcheting teeth of the piston mesh with teeth of the plurality of ratcheting teeth of the retaining assembly.

2. The automatic transmission of claim 1, wherein a distal end of the piston and the multi-disk clutch pack are spaced apart from each other h an air gap when the piston is in the disengaged configuration, the retaining assembly and the slot of the transmission housing each having a respective width, the width of the slot of the transmission housing being larger than the width of the retaining assembly by about a width of the air gap between the distal end of the piston and the multi-disk clutch pack when the piston is in the disengaged configuration.

3. The automatic transmission of claim 1, wherein the plurality of ratcheting teeth of the piston is positioned at an outer surface of the piston, the plurality of ratcheting teeth of the retaining assembly positioned at an inner surface of the retaining assembly.

4. The automatic transmission of claim 3, wherein the retaining assembly comprises an elastic compression ring and a plurality of ratchet sleeves, the plurality of ratchet sleeves positioned at the inner surface of the retaining assembly and defining the plurality of ratcheting teeth of the retaining assembly, the elastic compression ring extending about the plurality of ratchet sleeves and compressing the plurality of ratchet sleeves onto the piston.

5. The automatic transmission of claim 4, wherein the ratchet sleeves of the plurality of ratchet sleeves are circumferentially spaced apart from each other about the piston.

6. The automatic transmission of claim 4, wherein the elastic compression ring is constructed with an elastomer and the ratchet sleeves of the plurality of ratchet sleeves are constructed with a metal.

7. The automatic transmission of claim 3, wherein the plurality of ratcheting teeth of the piston are axially distributed along the outer surface of the piston and extend circumferentially about the outer surface of the piston.

8. The automatic transmission of claim 1, further comprising a spring coupled to the transmission housing and the retaining assembly, the spring positioned such that the spring urges the piston towards the disengaged configuration.

9. The automatic transmission of claim 1, wherein the plurality of ratcheting teeth of the retaining assembly has at least ten more ratcheting teeth than the plurality of ratcheting teeth of the piston.

10. The automatic transmission of claim 1, wherein at least one disk of the multi-disk clutch pack is mounted to the transmission housing such that the at least one disk of the multi-disk clutch pack does not rotate relative to the transmission housing.

11. A brake clutch for an automatic transmission, comprising:
   a multi-disk clutch pack;
   a piston positioned adjacent the multi-disc clutch pack and movable between an engaged configuration and a disengaged configuration relative to the multi-disc clutch pack, the piston defining a plurality of ratcheting teeth;
   a retaining assembly positioned on and extending about the piston, the retaining assembly defining a plurality of ratcheting teeth, teeth of the plurality of ratcheting teeth of the piston meshed with teeth of the plurality of ratcheting teeth of the retaining assembly.

12. The brake clutch of claim 11, wherein the plurality of ratcheting teeth of the piston is positioned at an outer surface of the piston, the plurality of ratcheting teeth of the retaining assembly positioned at an inner surface of the retaining assembly.

13. The brake clutch of claim 12, wherein the retaining assembly comprises an elastic compression ring and a plurality of ratchet sleeves, the plurality of ratchet sleeves positioned at the inner surface of the retaining assembly and defining the plurality of ratcheting teeth of the retaining assembly, the elastic compression ring extending about the plurality of ratchet sleeves and compressing the plurality of ratchet sleeves onto the piston.

14. The brake clutch of claim 13, wherein the ratchet sleeves of the plurality of ratchet sleeves are circumferentially spaced apart from each other about the piston.

15. The brake clutch of claim 13, wherein the elastic compression ring is constructed with an elastomer and the ratchet sleeves of the plurality of ratchet sleeves are constructed with a metal.

16. The brake clutch of claim 12, wherein the teeth of plurality of ratcheting teeth of the piston are axially distributed along the outer surface of the piston and extend circumferentially about the outer surface of the piston.

17. The brake clutch of claim 11, wherein each tooth of plurality of ratcheting teeth of the piston includes a sliding surface and a locking surface, the sliding surface of each tooth of plurality of ratcheting teeth of the piston facing towards the multi-disk clutch pack, the locking surface of each tooth of plurality of ratcheting teeth of the piston facing away from the multi-disk clutch pack.

18. The brake clutch of claim 17, wherein the locking surfaces of the plurality of ratcheting teeth of the piston are positioned and oriented for engaging the plurality of ratcheting teeth of the retaining assembly in order to block movement of the piston relative to the retaining assembly along a first axial direction, the sliding surfaces of the plurality of ratcheting teeth of the piston are positioned and oriented engaging the plurality of ratcheting teeth of the retaining assembly in order to permit movement of the piston relative to the retaining assembly along a second opposite, axial direction.

19. The brake clutch of claim 11, further comprising a spring coupled to the retaining assembly and configured for urging the piston towards the disengaged configuration.

20. The brake clutch of claim 11, wherein the plurality of ratcheting teeth of the retaining assembly has at least ten more ratcheting teeth than the plurality of ratcheting teeth of the piston.

* * * * *